United States Patent [19]

Kohlbauer et al.

[11] Patent Number: 5,035,557
[45] Date of Patent: Jul. 30, 1991

[54] CHUCK FOR AXIALLY CLAMPING A TOOL TO A MACHINE TOOL SPINDLE

[75] Inventors: Johann Kohlbauer, Ebermannstadt; Horst Jäger, Nürnberg, both of Fed. Rep. of Germany

[73] Assignee: Hertel AG Werkzeuge & Hartstoffe, Fürth, Fed. Rep. of Germany

[21] Appl. No.: 504,313

[22] Filed: Apr. 4, 1990

[30] Foreign Application Priority Data

Apr. 5, 1989 [DE] Fed. Rep. of Germany ....... 3910965
Nov. 28, 1989 [DE] Fed. Rep. of Germany ....... 3939227

[51] Int. Cl.$^5$ .............................. B23C 5/26; B23B 31/02
[52] U.S. Cl. ................................................ 409/233
[58] Field of Search ...................... 409/232, 233, 234; 408/239 R, 239 A; 279/89

[56] References Cited

U.S. PATENT DOCUMENTS

| 3,323,419 | 6/1967 | Riedel | 409/233 |
| 3,533,638 | 10/1970 | Sedgwick | 279/89 |
| 3,791,257 | 2/1974 | Frazier et al. | 409/233 |
| 4,406,195 | 9/1983 | Krüger et al. | 82/160 |
| 4,844,671 | 7/1989 | Reinauer | 409/233 |
| 4,863,323 | 9/1989 | Glaser | 409/323 |

FOREIGN PATENT DOCUMENTS

| 291048 | 11/1988 | European Pat. Off. |
| 3719451 | 1/1989 | Fed. Rep. of Germany |
| 310942 | 4/1989 | European Pat. Off. |
| 3007440 | 12/1988 | Fed. Rep. of Germany |

Primary Examiner—William Briggs
Attorney, Agent, or Firm—Spencer and Frank

[57] ABSTRACT

A rotary chuck for axially clamping a tool includes a spindle terminus forming part of a rotary machine tool spindle; a clamping element holder immobilized in the central bore of the spindle terminus; and a plurality of clamping elements circumferentially evenly distributed about the holder. Each clamping element is a one-armed spreading lever having a first end pivotally supported in the holder to provide for a pivotal movement of each clamping element in a plane containing the spindle axis. Each clamping element has a second end having a radially outwardly swung clamping position in which each second end is adapted to be clamped against an inner shoulder of a hollow tool shank received in the spindle bore for axially pulling the tool into engagement with a frontal end face of the spindle terminus. Each second end has a radially inwardly swung releasing position in which the tool is released from the chuck. There is further provided a clamping drive extending coaxially with the spindle axis and being operatively coupled to the clamping elements. The clamping drive is axially movable in a first direction for displacing the clamping elements into the clamping position and in a second direction for displacing the clamping elements into the releasing position.

20 Claims, 10 Drawing Sheets

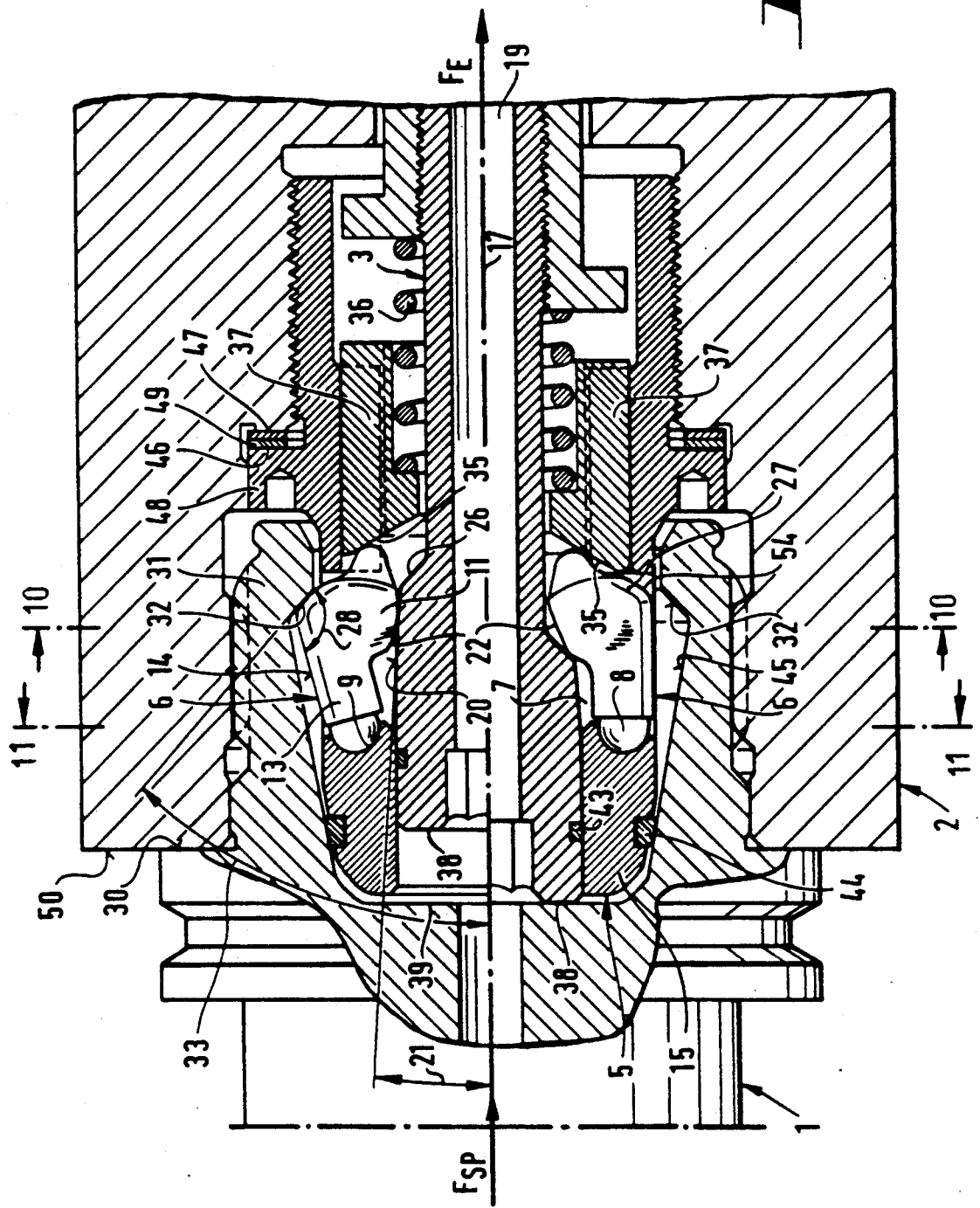

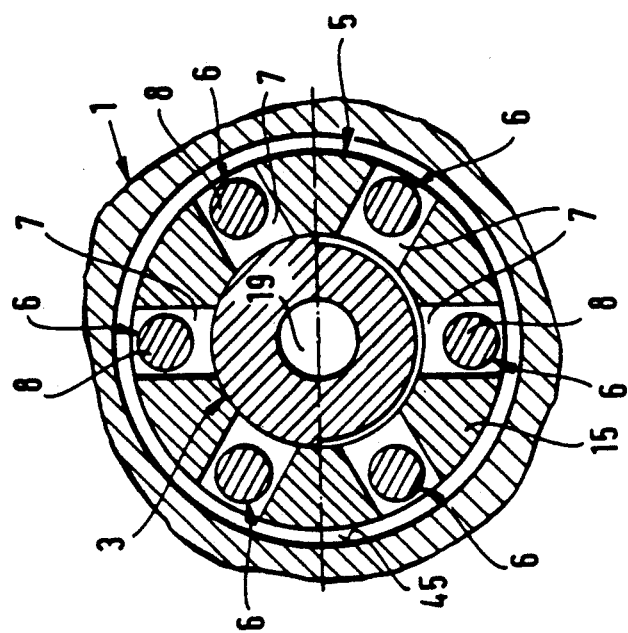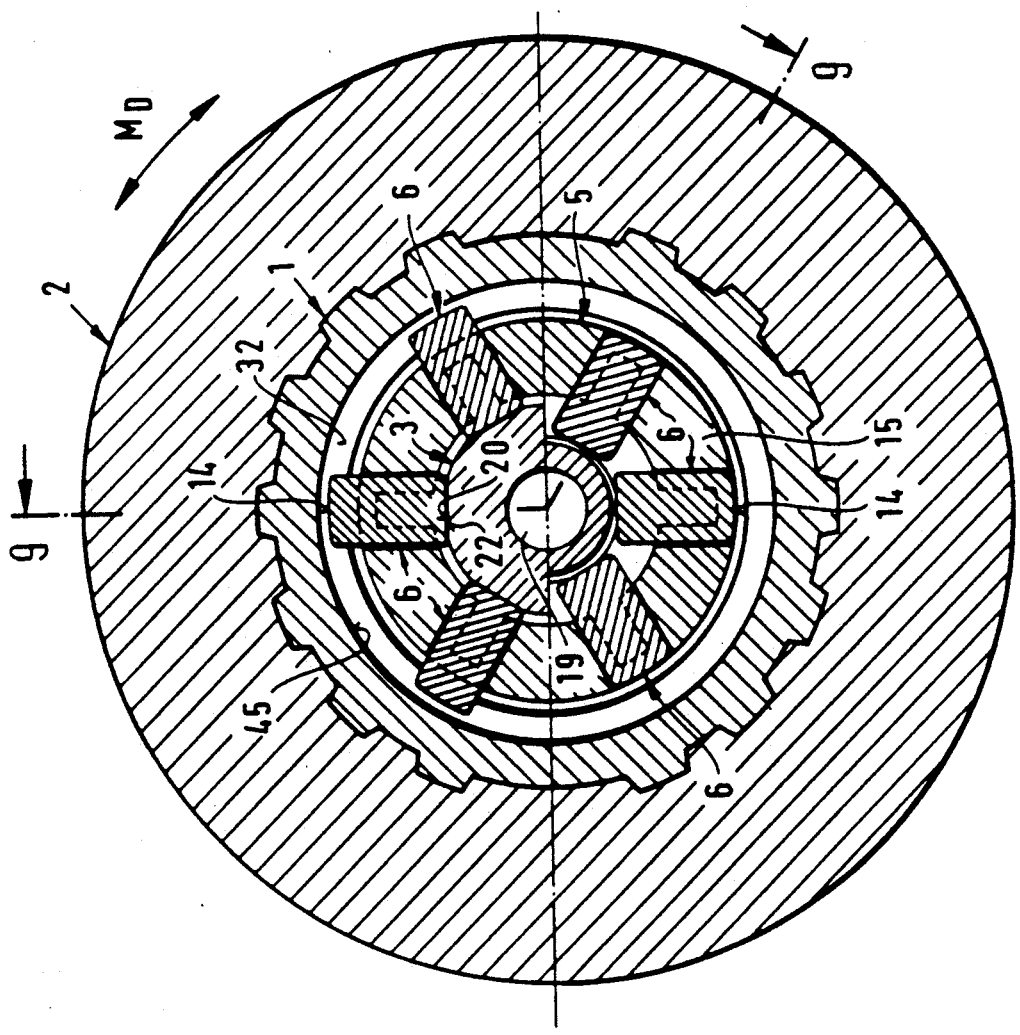

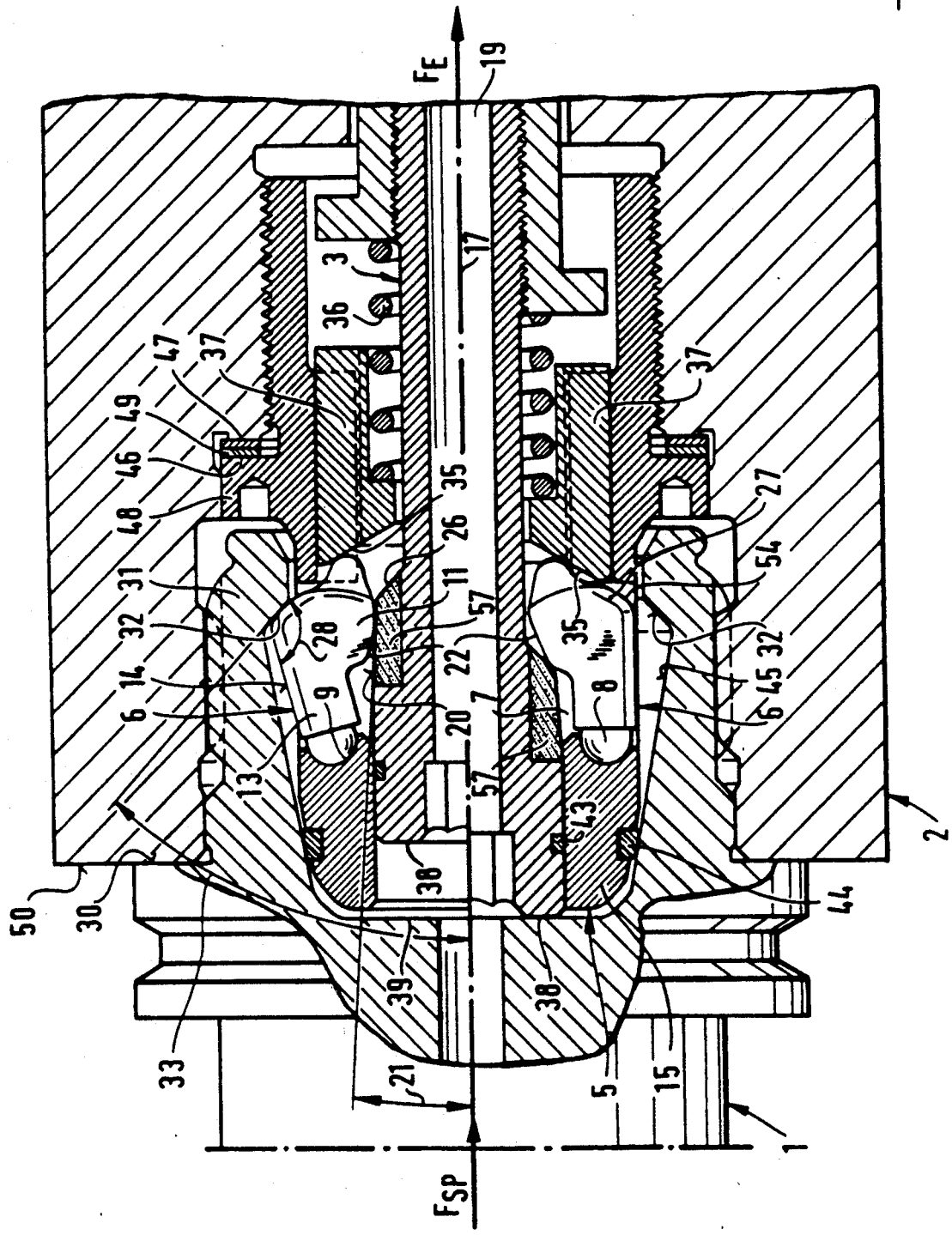

CHUCK FOR AXIALLY CLAMPING A TOOL TO A MACHINE TOOL SPINDLE

CROSS REFERENCE TO RELATED APPLICATION

This application claims the priority of Federal Republic of Germany Application Nos. P 39 10 965.8 filed Apr. 5th, 1989 and P 39 39 227.9 filed Nov. 28th, 1989, which are incorporated herein by reference.

BACKGROUND OF THE INVENTION

The present invention relates to a chuck for axially clamping a tool to a machine tool spindle. The tool has a hollow, sleeve-like shank introducible in the direction of the central axis into an axial bore of a frontal terminus of the machine tool spindle. The tool is tightened in the axial direction by means of spreading members which are uniformly distributed around the central axis and are spread apart by means of a central clamping drive and thus exert a force on the interior wall of the tool shank. As a result, a rearward annular radial face of the tool is pulled into an approximately planar contact with an opposing frontal face of the end of the machine tool spindle. Such a chuck is disclosed, for example, in published European Application 310,942, to which corresponds U.S. Pat. No. 4,863,323 or German Patent document 3,007,440, to which corresponds U.S. Pat. No. 4,406,195.

The spindles of up-to-date machine tools operate at very high circumferential velocities and, due to their high cutting power, are subject to intensive heating. For this reason, generally chucks are used where the tools are pulled into a face-to-face contact against a planar counter-surface of the machine spindle so as to ensure high axial precision and rigidity. The clamping takes place from the inside outwardly with respect to the tool shank to thus reliably absorb the centrifugal forces which are unavoidable at the high circumferential velocities.

Reliable clamping requires very high clamping pressures. It is disadvantageous if these pressures are absorbed as point-type loads by the members of the clamping drive.

SUMMARY OF THE INVENTION

It is an object of the invention to provide a chuck of the above-outlined type which ensures operation of the clamping drive members without malfunction and substantially avoids point-type loads on the clamping drive members.

This object and others to become apparent as the specification progresses, are accomplished by the invention, according to which, briefly stated, the rotary chuck for axially clamping a tool includes a spindle terminus forming part of a rotary machine tool spindle; a clamping element holder immobilized in the central bore of the spindle terminus; and a plurality of clamping elements circumferentially evenly distributed about the holder. Each clamping element is a one-armed spreading lever having a first end pivotally supported in the holder to provide for a pivotal movement of each clamping element in a plane containing the spindle axis. Each clamping element has a second end having a radially outwardly swung clamping position in which each second end is adapted to be clamped against an inner shoulder of a hollow tool shank received in the spindle bore for axially pulling the tool into engagement with a frontal end face of the spindle terminus. Each second end has a radially inwardly swung releasing position in which the tool is released from the chuck. There is further provided a clamping drive extending coaxially with the spindle axis and being operatively coupled to the clamping elements. The clamping drive is axially movable in a first direction for displacing the clamping elements into the clamping position and in a second direction for displacing the clamping elements into the releasing position.

The above-outlined solution ensures high clamping pressures which are generated by comparably limited clamping drive forces. It is of importance that the clamping drive forces are primarily only pressure forces; this avoids the occurrence of fit rust. Moreover, the members provided for transferring the clamping pressure can be made of hard metal or ceramics which, although their tensile strength is low, exhibit high pressure resistance. Pressure resistance and the prevention of fit rust may be further improved by coatings.

The structural configuration of the subject matter of the present invention ensures that the clamping pressure exerted by the chuck is oriented essentially axially, that is, toward the frontal planar end face of the spindle.

The acute-angle position of the clamping slope for producing and maintaining the final clamped state is selected in such a manner that it may lie in the self-locking range even if there is a drop in the power of the clamping drive, so as to provide for a high power transmission ratio and retention o the clamping force.

BRIEF DESCRIPTION OF THE DRAWING

FIG. 9 is a sectional view taken along line 9-9 of FIG. 10, of another preferred embodiment, with the clamping components being shown in the clamped position above the central longitudinal axis and in the released position below the central longitudinal axis.

FIG. 10 is a sectional view taken along line 10—10 of FIG. 9.

FIG. 11 is a sectional view taken along line 11—11 of FIG. 9.

FIG. 12 is an axial sectional view of still another preferred embodiment of the invention.

DESCRIPTION OF THE PREFERRED EMBODIMENTS

Figure 6:
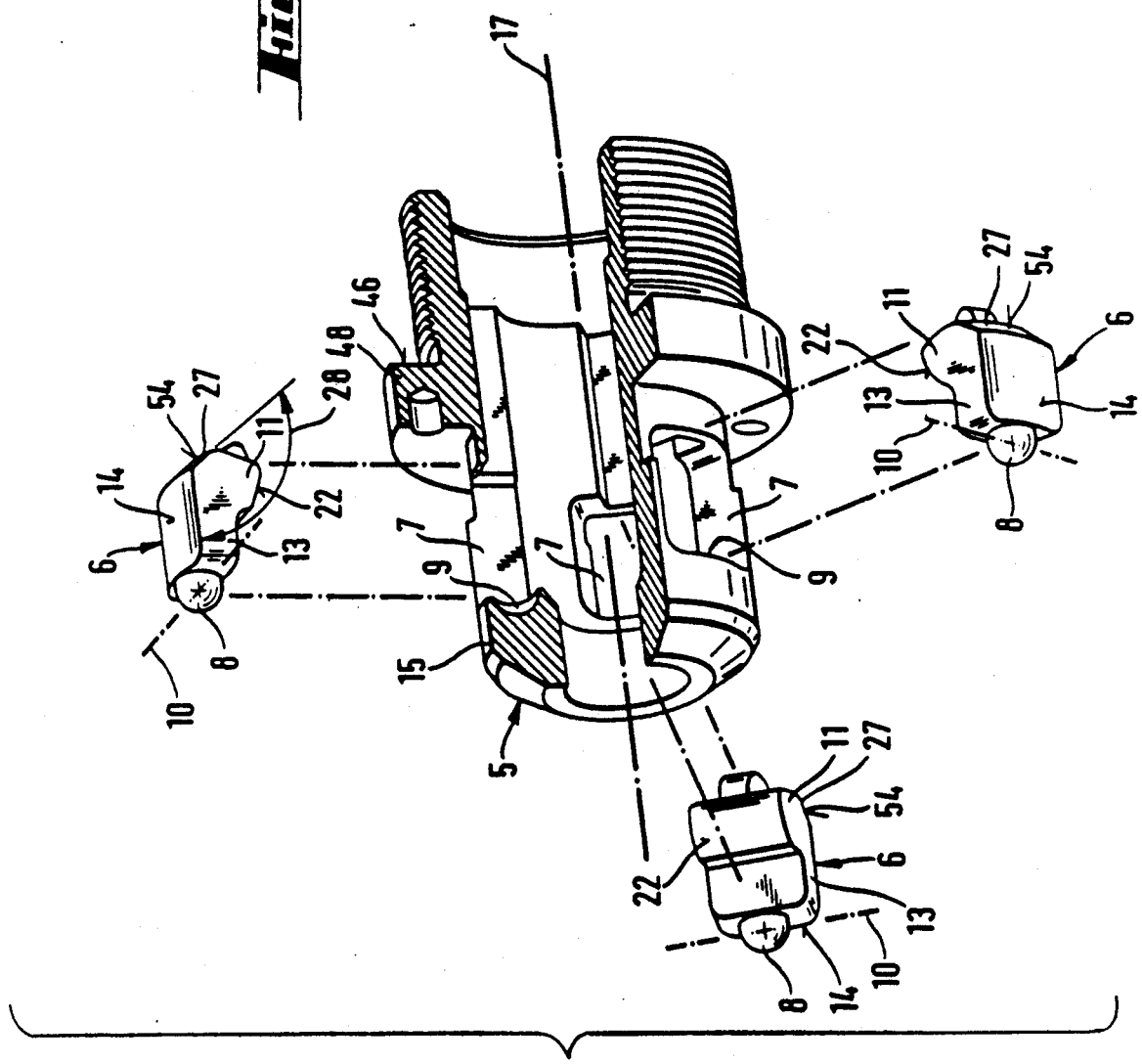
FIG. 6 is an exploded perspective, broken-away view of only the guide sleeve and its associated spreading levers of the preferred embodiment.

The essential components of the chuck shown in the drawing figures include a tool holder (hereinafter "tool") 1, the spindle 2 of a machine tool, a holding bolt 3, a draw rod 4 and a guide sleeve 5 for guiding holding bolt 3 and draw rod 4 together with their associated spreading levers 6. Spreading levers 6 are clamping body type clamping elements of which at least two are distributed uniformly over the circumference. Spreading levers 6 are pivotally mounted in throughgoing apertures 7 which are disposed on the circumference of guide sleeve 5 which thus also functions as a clamping element holding means. The bearing is, for example, a ball or cylinder segment bearing. For this purpose, the ends of spreading levers 6 facing tool 1 when installed are provided with a convex, spherical or roll segment-like raised portion 8 with which spreading levers 6 are supported on the flanks 9 of apertures 7. Flanks 9 are recessed in the manner of a bowl and face the tool when installed. The theoretical pivot axes of spreading levers 6 in the final installed position are designated at 10 (FIG. 6).

Seen from the side, spreading levers 6 have an essentially L or angular shape. In the released position (FIGS. 2, 3), the control portion (arm) 11 of the L engages in a circumferential recess 12 of holding bolt 3 in such a manner that the back 14 of the pressure portion (arm) 13 of the L does not project beyond the circumference of the adjacent regions of the apertures 7 but assumes its position within the theoretical cylinder enclosing these adjacent regions formed by the outer circumference of the hollow cylindrical stub 15 of guide sleeve 5. Guide sleeve 5 is screwed axially into spindle (spindle terminus) 2 and is consequently unitary with the spindle with respect to its function. It serves, among others, to provide an axially displaceable bearing for holding bolt 3 which it surrounds in a sleeve-like manner. In the final installed position, guide sleeve 5 is axially screwed into spindle 2 from the side of the tool. For this purpose, spindle 2 is provided with a central bore 16 which begins at the opposite frontal face 50 and extends in the direction of a central axis 17. On its side facing away from tool 1, the central bore 16 opens into a central internal thread 16a which serves to threadedly hold the guide sleeve 5 on the spindle 2.

Holding bolt 3 is guided in guide sleeve 5. In its installed position, holding bolt 3 is fixed by means of pull rod 4 which is screwed into holding bolt 3 from the rear of the spindle 2. In the final installed position, the longitudinal axes of holding bolt 3 and draw rod 4 coincide with central axis 17 of the clamping device. The screw connection between holding bolt 3 and draw rod 4 is established in the region of the connecting thread 18 between these two components.

Draw rod 4 and holding bolt 3 are each provided with a passage bore 19 for a coolant or for the passage of actuating elements (not shown), for example, for controllable tools. The bore 19 extends coaxially with the central axis 17.

Figure 4:
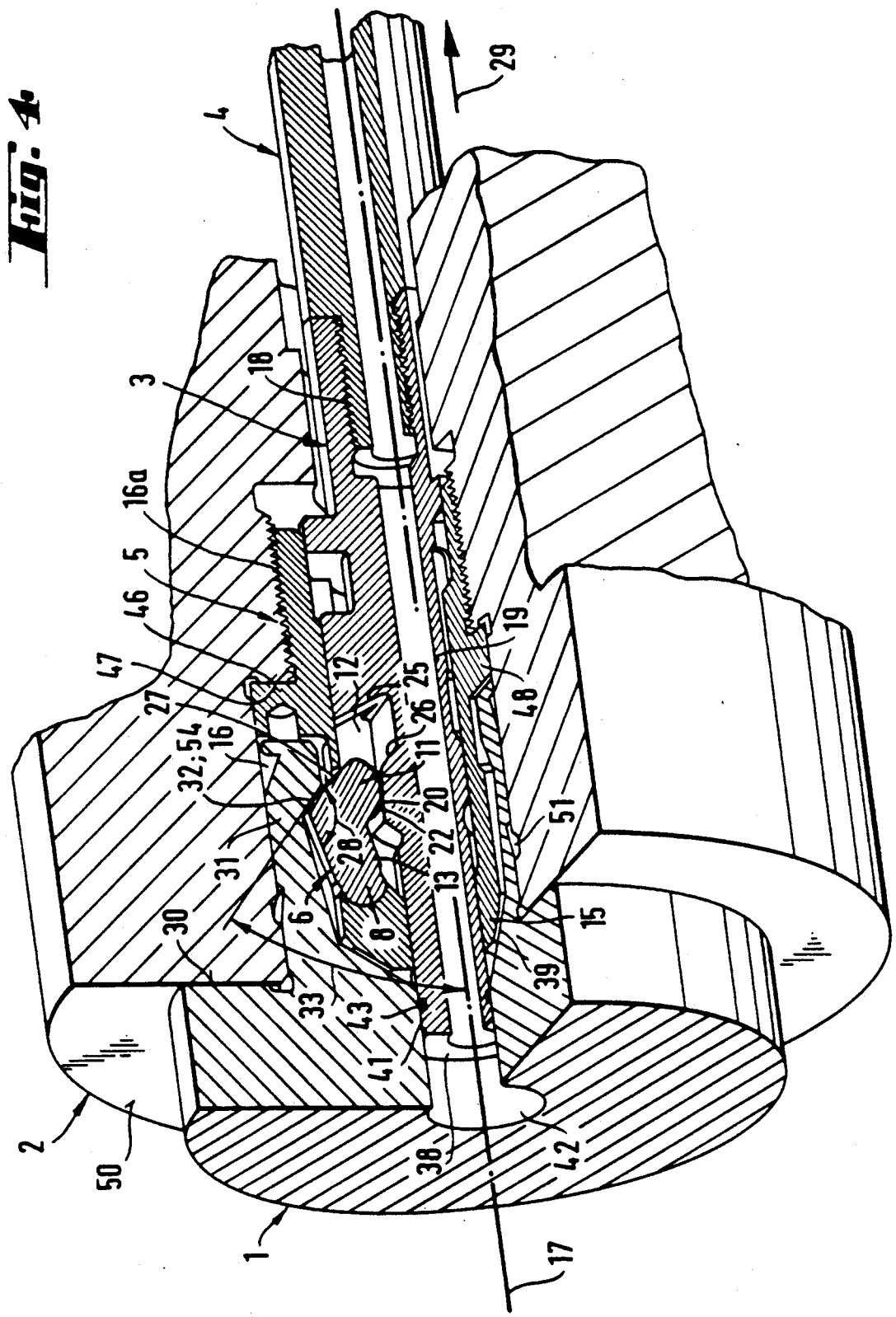
FIG. 4 is an illustration corresponding to that of FIG. 3, depicting the tool firmly clamped into the spindle in its final clamped state.
Figure 5:
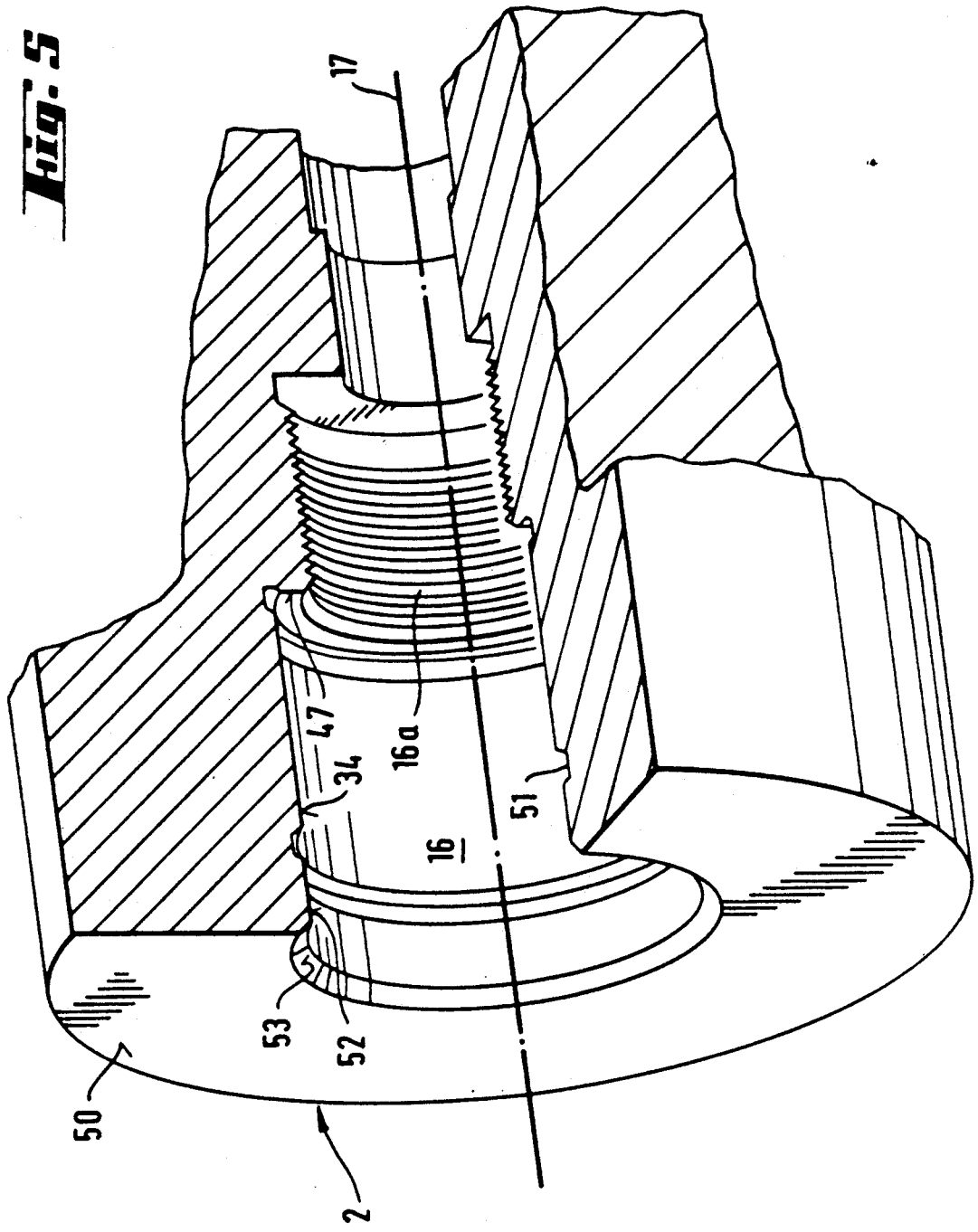
FIG. 5 is a fragmentary perspective, broken-away view of the spindle.

On its circumference, adjacent to circumferential recesses 12, holding bolt 3 is provided with clamping slopes 20. These clamping slopes 20 are faces or face segments which enclose a very acute angle 21 with central axis 17. The angle 21 is closed in the direction toward the spindleside end. In the final clamped position, the control portions 11 of the L-shaped spreading levers 6 rest on clamping slopes 20 as shown, for example, in FIG. 4. For this purpose, the interior faces (engagement faces) 22 of the control portions 11 of the L-shaped spreading levers facing clamping slopes 20 are curved in the manner of an exterior spherical or roll segment face in order to enable them to slide on clamping slopes 20 with particular ease and without wear. The acute angle 21 of clamping slopes 20 is dimensioned in such a way that self-locking results which produces a great force transmission ratio. Thus the clamping force transferred to holding bolt 3 is maintained even if the clamping pressure acting on draw rod 4 were to drop.

Figure 1:
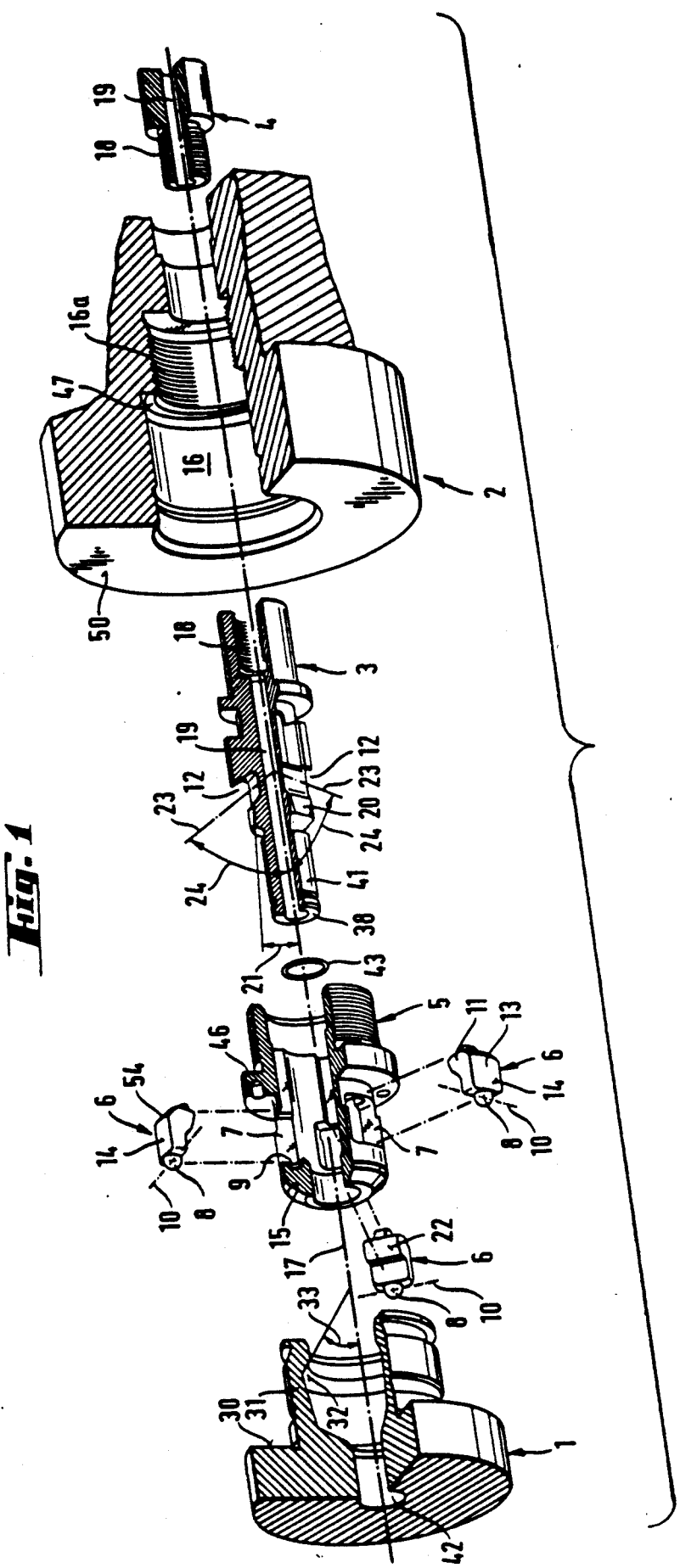
FIG. 1 is an exploded perspective, broken-away view of the chuck according to a preferred embodiment of the invention.
Figure 2:
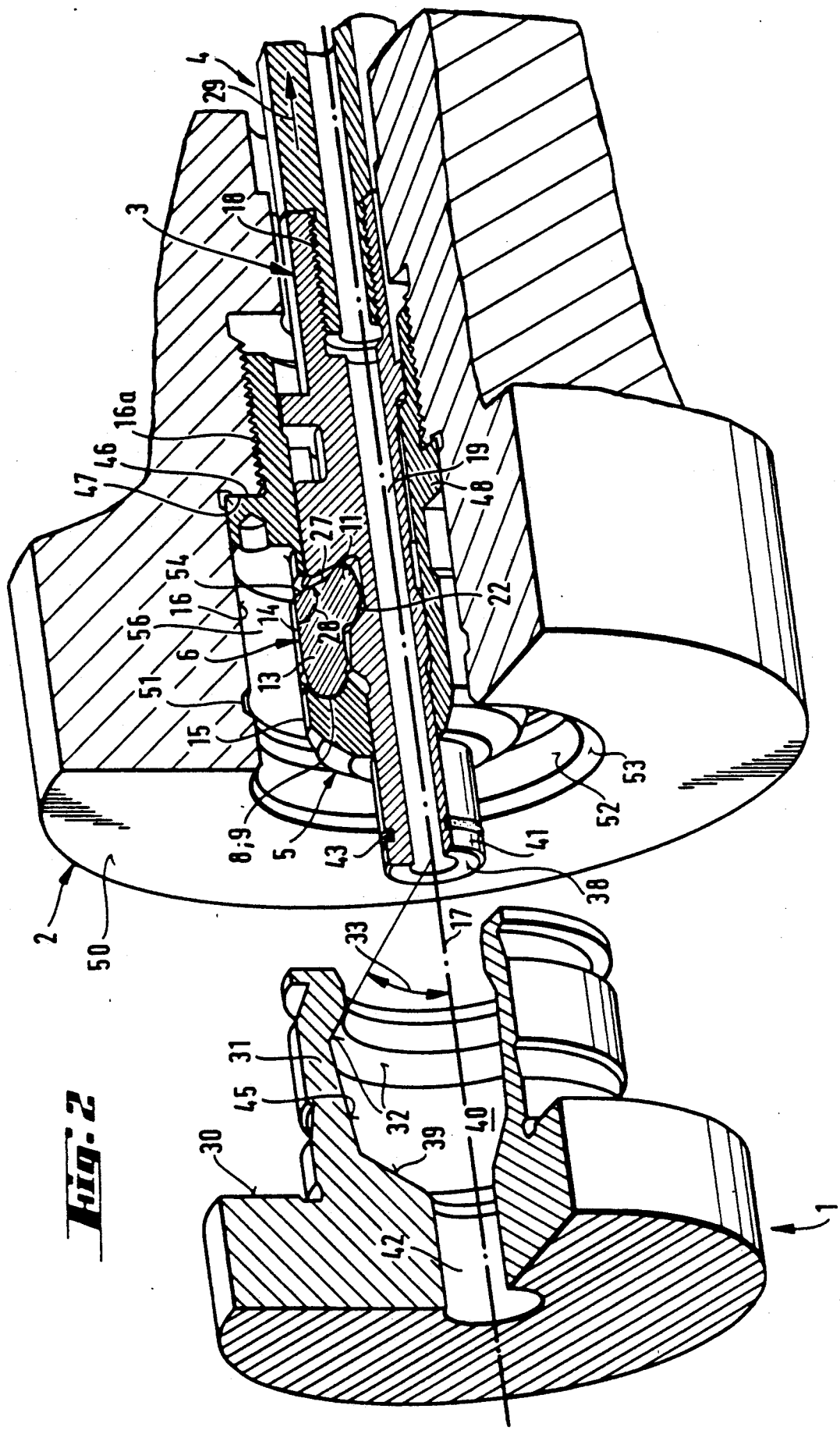
FIG. 2 is a perspective, broken-away view of the preferred embodiment in the released position.
Figure 3:
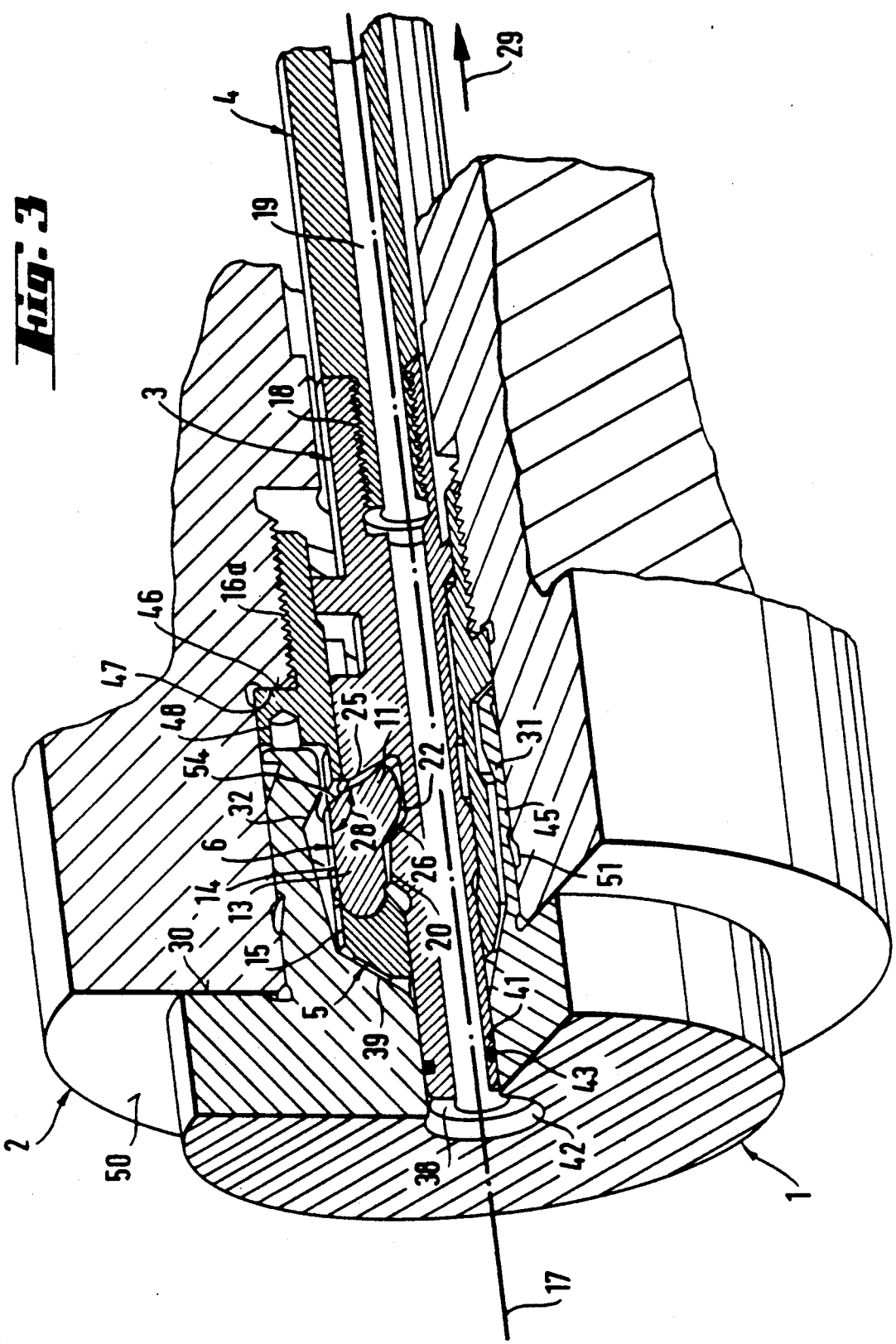
FIG. 3 is a perspective, broken-away view of the preferred embodiment with the tool inserted but not yet clamped tight.
Figure 7:
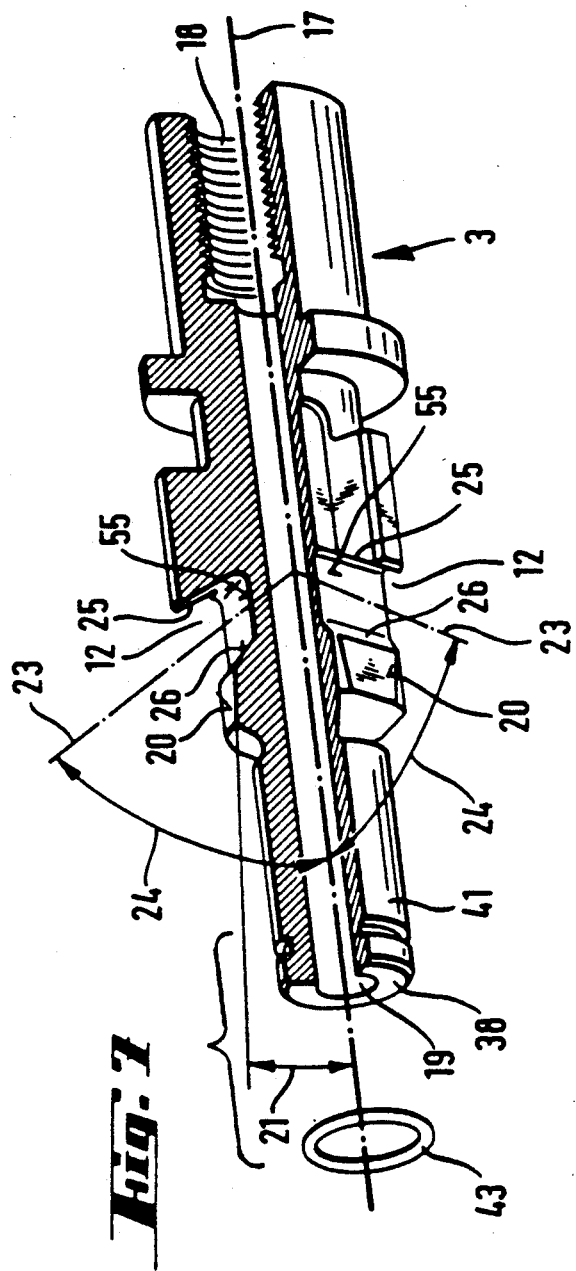
FIG. 7 is a perspective, broken-away view of the holding bolt of the preferred embodiment.
Figure 8:
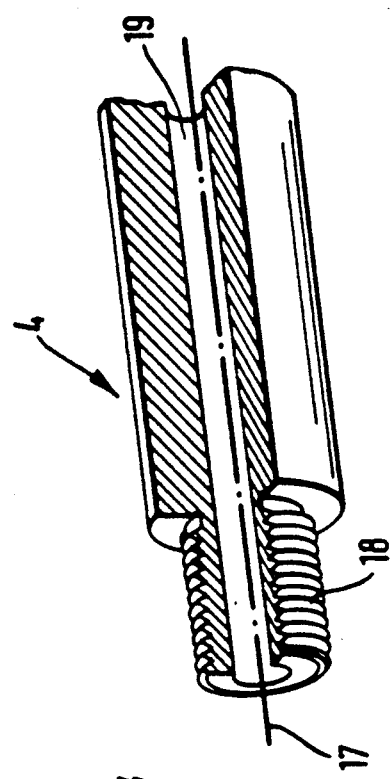
FIG. 8 is a perspective, broken-away illustration of the draw rod of the preferred embodiment, acting on and fixed to the holding bolt so as to act as its drive means when the chuck is installed.

The center axes 23 of circumferential recesses 12 in holding bolt 3 together with central axis 17 form an acute inclination angle 24 of 45° to 75°, particularly of about 60°, which opens toward the side of tool 1 (FIG. 7). A similar angle of about 60° is also defined between the two flanks 25 and 26 of the circumferential recesses 12 of holding bolt 3 and central axis 17. The inner clamping slope flanks 26 of circumferential recesses 12 serve as control slopes against which lie the interior faces 22 of the control portions 11 of L-shaped spreading levers 6 when in the released position. Since the acute inclination angle 24 of clamping slope faces 26 defined with central axis 17 at 60° is considerably greater than the acute angle 21 of clamping slopes 20, it lies outside of the self-locking range. The outer retraction slope flanks 25 of circumferential recesses 12 serve to forcibly return, in a radially inwardly direction, the spreading levers 6 into their released position (FIGS. 2, 3).

The upper side 27 of the control portion 11 of each spreading lever 6 forms an obtuse angle 28 with the rear 14 of the pressure portion 13. The part of the upper side 27 of each spreading lever 6 which, in the spread position, projects from the circumferential face of hollow cylindrical stub 15 of guide sleeve 5, transfers the clamping pressure which essentially acts in the axial clamping direction 29, from holding bolt 3 to tool 1. For this purpose, the axial frontal face 30 of the tool which, in the clamped position, lies against the corresponding counter-face of spindle 2 is provided with a hollow shank or clamping sleeve 31 which projects in the direction toward the spindle end. On its interior circumference, clamping sleeve 31 is provided with an annular face or shoulder 32 as the counter-face to the pressure sides of spreading levers 6. The annular face 32 forms an acute angle 33 with central axis 17 which angle closes in the direction toward the spindle-side end 2. In the clamped state, spreading levers 6 exert an axial pressure by way of annular face 32 so as to press the rear radial face 30 of tool 1 against the corresponding counter-face 50 on spindle 2.

The exterior circumferential face of clamping sleeve 31 corresponds in shape to the interior outline of circumferential wall 34 of central bore 16.

In the embodiment of FIG. 10, the retraction slope for spreading levers 6 is, instead of a one-piece component of holding bolt 3, the frontal face 35 (FIG. 9) of a retraction sleeve 37 which is biased by a compression spring 36 in the direction of tool 1 and surrounds holding bolt 3. This embodiment is preferred if the front end 38 of holding bolt 3, when transferred into the released position, is simultaneously to become effective as an ejection pin against the inner annular frontal face 39 (FIGS. 2, 9) of an annular chamber 40 enclosed by clamping sleeve 31. This generally provides an increased lifting and displacement length for holding bolt 3 when it is moved from the clamping position (FIG. 4) into the advanced release position (FIGS. 2, 3).

In the final installed position, the front end 41 of holding bolt 3 projects into a corresponding guide bore 42 of tool 1. The front end 41 of holding bolt 3 is surrounded by an annular seal 43 which cooperates with the interior wall of guide bore 42. A similar annular seal 44 may surround the cylindrical stub 15 of guide sleeve 5. This annular seal 44 (FIGS. 9, 12) then lies against the annular wall 45 of clamping sleeve 31 which forms annular chamber 40.

An annular radial face 46 of guide sleeve 5 may be brought in contact with a corresponding annular counter-face 47 of spindle 2. For this purpose, annular face 46 is a component of an annular flange 48 which surrounds guide sleeve 5. Between annular face 46 and annular counter-face 47, spacer discs 49 may be inserted (FIG. 2) so as to compensate for a possible wear of counter-face 50 of spindle 2 relative to the radial face 30 of tool 1. In this way, the screw-in depth of guide sleeve 5 into spindle 2 can be adjusted as desired.

The circumferential wall 34 of central bore 16 in spindle 2 is subdivided axially by an annular dividing groove 51. The thus partitioned outer annular enveloping face 52 of central bore 16 at the side of the opening serves, for example, merely as a centering face. For this purpose, it is provided at its front end with an insertion slope 53 for the tubular end of clamping sleeve 31 of tool 1.

The chuck according to the invention operates as follows:

In the released position shown in FIG. 2, holding bolt 3 is in its final released position where it is advanced in a direction opposite to the clamping direction 29. In this position, spreading levers 6, in their radially retracted released position, lie hidden in the hollow cylindrical stub 15 of guide sleeve 5 in such a manner that their edge faces 14 do not project radially outwardly beyond the enveloping cylinder of hollow cylindrical stub 15. Thus, tool 1 and its tubular clamping sleeve 31 can be introduced unimpededly into the annular space (insertion opening) formed between the outer circumference of stub 15 and the inner circumference of central bore 16, until the radial face 30 of tool 1 abuts at the counter-frontal face 50 of spindle 2.

Reverting once again to FIGS. 3 and 4, the machine tool thereafter pulls the draw rod 4 in the clamping direction 29. Draw rod 4 carries along holding bolt 5. This causes the clamping slope flanks 26 of circumferential recesses 12 to slide along the interior faces 22 of the control portions 11 of L-shaped spreading levers 6 and causes the spreading levers 6 to be spread radially outwardly. The inner clamping slope flanks 26 thus form a spreading or control slope and thus act on spreading levers 6. The upper ends of the exterior faces 27 of the control portions 11 of the L-shaped spreading levers 6 include engage neat face, 84 which thus place themselves against the annular shoulder face 32 of annular chamber 40 in clamping sleeve 31 and urge the latter in the clamping direction 29.

The tightening stroke of draw rod 4 and of holding bolt 5 is dimensioned in such a way that the inner clamping slope flanks 26 of circumferential recesses 12, that is, the control or spreading slopes of holding bolt 3 break contact with the interior faces 22 of the control portions 11 of L-shaped spreading levers 6. Thus, the ends of the inner faces 22 of spreading levers 6 slide onto the clamping slopes 20 of holding bolt 5 whose angle 21 with central axis 17 is significantly more acute so as to establish an automatic lock between clamping slopes 20 and the control portions 11 of L-shaped spreading levers 6.

During their spreading movement and in their final spread position (FIGS. 4, 9 and 12), L-shaped clamping levers 6 are axially supported by means of the raised portions 8 of their pressure portions 13 against the trough-shaped flanks 9 of apertures 7 in guide sleeve 5. Therefore, in the clamping position, both portions 11 and 13 of spreading levers 6 are advantageously exposed only to pressure and not to any tension. The spreading levers 6 may be made of a very hard material that, however, does not have a high tensile strength, such as a hard metal or a ceramic material. In this way, the occurrence of fit rust is also avoided which is a problem particularly when working with a coolant in clamping devices.

For release of tool 1, the clamping process of draw rod 4 is reversed. Draw rod 4 is pushed forward in the direction opposite to clamping direction 29. This causes the retraction slope flanks 25 of circumferential recesses 12 of holding bolt 3 to push the control portions 11 of L-shaped spreading levers 6 back into circumferential recesses 12. The sloped position of the outer retraction slope flanks 25 of circumferential recesses 12 serve as a retraction safety (acute angle of inclination 24). In any event, the outer retraction slope flank 25 of circumferential recesses 12 exerts a force on the exterior engagement faces 27 of control portion 11 of L-shaped spreading levers 6 which are thus forced to pivot radially inwardly about their theoretical pivot axes 10 (FIG. 6), thus causing the interior control portion 11 to sink into circumferential recesses 12 in the direction toward the bottoms 55 of the recesses until the edge faces 14 of the exterior pressure portions 13 of L-shaped spreading levers 6 no longer project beyond the circumference of the hollow cylindrical stubs 15 of the guide sleeve 5. In this state (FIGS. 2, 3), the tool can be removed from spindle 2 without interference in a direction opposite to the clamping direction 29.

In the embodiment of FIG. 9, holding bolt 3 has a greater releasing stroke so that it may perform the additional function of an ejector pin to thus provide for a reliable release of tool 1 from spindle 2. In this case, retraction sleeve 37 serves to pivot spreading levers 6 radially inwardly into their rest or released position analogous to FIGS. 2 and 3. The inwardly directed retraction stroke performed by retraction sleeve 37 which is generated by compression spring 36, is smaller than the release or ejection thrust of draw rod 4 and holding bolt 3, respectively.

In the embodiment according to FIG. 12, the clamping slope faces 26 are part of a pressure ring 57 of a highly pressure resistant material, such as hard metal or ceramics which is circumferentially embedded in the holding bolt 3.

It will be understood that the above description of the present invention is susceptible to various modifications, changes and adaptations, and the same are intended to be comprehended within the meaning and range of equivalents of the appended claims.

What is claimed is:

1. A rotary chuck for axially clamping a tool, comprising
   (a) a central longitudinal axis;
   (b) a spindle terminus forming part of a rotary machine tool spindle; said spindle terminus having (1) a frontal end face;
(2) means defining a throughgoing bore terminating in said frontal end face;
(c) clamping element holding means immobilized in the bore;
(d) a plurality of clamping elements circumferentially evenly distributed about said clamping element holding means; each clamping element being formed as a one-armed spreading lever having a first end pivotally supported in said clamping element holding means to provide for a pivotal movement of each said clamping element in a plane containing said axis; each clamping element having a second end provided with first and second engagement faces; said second end being spaced from said first end in a direction oriented away from said frontal end face; each clamping element having a radially outwardly swung clamping position in which each respective said first engagement face is adapted to be clamped against an inner shoulder of a hollow tool shank received in said bore for axially pulling the tool into engagement with said frontal end face of said spindle terminus; each said clamping element having a radially inwardly swung releasing position in which the tool is released from the chuck; and
(e) clamping drive means extending coaxially with said axis and having a clamping slope cooperating with a respective said second engagement face of said clamping elements; said clamping drive means being axially movable in a first direction for displacing said clamping elements, by camming action between the clamping slope and the second engagement faces, into said clamping position; said clamping drive means being movable in a second direction for displacing said clamping elements into said releasing position; said clamping slope of said clamping drive means having a clamping slope portion being in engagement with said second engagement faces in said clamping position; said clamping slope portion being oriented to said central axis at such an angle as to self-lock the spreading levers in the clamping position.

2. A rotary chuck as defined in claim 1, in combination with the tool; said inner shoulder of the hollow tool shank is formed by a conical face enclosing an acute angle with the central axis; said acute angle being closed in the first direction.

3. A rotary chuck as defined in claim 1, wherein said clamping drive means includes a holding bolt situated in said bore and being longitudinally displaceable therein; said clamping slope being disposed on the circumference of the holding bolt.

4. A rotary chuck as defined in claim 3, wherein said holding bolt has a frontal ejection face arranged to engage the tool and pushing the tool out of the bore of the spindle terminus upon movement of the holding bolt in said second direction.

5. A rotary chuck as defined in claim 3, wherein the holding bolt is provided with a passage bore for a coolant.

6. A rotary chuck as defined in claim 3, wherein the clamping slope of the holding bolt is part of a pressure ring made of a highly pressure resistant material.

7. A rotary chuck as defined in claim 3, wherein said clamping element holding means includes a guide sleeve surrounding said holding bolt; said guide sleeve having wall means defining circumferentially distributed throughgoing apertures each receiving a separate said spreading lever; said first end of each spreading lever being pivotally supported in said wall means.

8. A rotary chuck as defined in claim 7, wherein at least one axial spacer disc is inserted between the guide sleeve and an inner shoulder of said spindle terminus; said inner shoulder surrounding said throughgoing bore.

9. A rotary chuck as defined in claim 7, wherein the first portions of said spreading levers lie in said throughgoing recesses approximately parallel to said central axis in said releasing position.

10. A rotary chuck as defined in claim 7, wherein the first end of each spreading lever is provided with a convex, curved segment-like projection received in a curved-bottom depression provided in said wall means in each recess to form an arcuate pivot bearing for each spreading lever.

11. A rotary chuck as defined in claim 10, wherein each said spreading lever has a first portion including said first end and the first engagement face of said second end; further wherein each said spreading lever has a second portion including said first engagement face; said first and second portions being at an angle to one another, whereby each said spreading lever has a generally L-shaped configuration.

12. A rotary chuck as defined in claim 11, wherein the angle enclosed by the first and second portions of each spreading lever is an obtuse angle.

13. A rotary chuck as defined in claim 11, wherein said second portion of each said spreading lever includes a third engagement face; further comprising a retraction sleeve axially slidably arranged coaxially with said holding bolt in said throughgoing bore of said spindle terminus; said retraction sleeve having a retraction face; said third engagement face cooperating with said retraction face; further comprising spring means for urging said retraction sleeve in said second direction.

14. A rotary chuck as defined in claim 11, wherein said holding bolt has circumferential recesses bounded by said clamping slope; said second portions projecting into said circumferential recesses.

15. A rotary chuck as defined in claim 14, further comprising retracting slopes bounding said circumferential recesses in said holding bolt; said retracting slopes being approximately parallel with respective said clamping slopes; said third engagement face of said spreading levers being engaged and biased by said retracting slopes when said holding bolt is moved in the second direction, whereby said spreading levers are moved by said holding bolt into said releasing position.

16. A rotary chuck as defined in claim 14, wherein said acute angle is between 45° and 75°.

17. A rotary chuck as defined in claim 16, wherein said acute angle is about 60°.

18. A rotary chuck as defined in claim 14, wherein said second engagement faces are convex.

19. A rotary chuck as defined in claim 18, wherein said clamping slope has a second clamping slope portion adjoining said first clamping slope portion in said first direction therefrom and arranged externally of said circumferential recesses; said second clamping slope portion being oriented at an acute angle to said central axis; said acute angle of said second clamping slope portion being closed in said first direction and being greater than the angle of said first clamping slope portion.

20. A rotary chuck for axially clamping a tool, comprising
 (a) a central longitudinal axis;
 (b) a spindle terminus forming part of a rotary machine tool spindle; said spindle terminus having
  (1) a frontal end face;
  (2) means defining a throughgoing bore;
 (c) clamping element holding means immobilized in the bore; said clamping element holding means including a guide sleeve having wall means defining circumferentially distributed throughgoing apertures;
 (d) a plurality of clamping elements circumferentially evenly distributed about said clamping element holding means; each clamping element being formed as a oneamred spreading lever having a first end pivotally supported in said wall means to provide for a pivotal movement of each said clamping element in a plane containing said axis; said throughgoing apertures each receiving a separate said spreading lever; each clamping element having a second end having a radially outwardly swung clamping position in which each said second end is adapted to be clamped against an inner shoulder of a hollow tool shank received in said bore for axially pulling the tool into engagement with said frontal end face of said spindle terminus; each said second end having a radially inwardly swung releasing position in which the tool is released from the chuck; and
 (e) clamping drive means extending coaxially with said axis and being operatively coupled to said clamping elements; said clamping drive means being axially movable in a first direction for displacing said clamping elements into said clamping position and in a second direction for displacing said clamping elements into said releasing position; said clamping drive means including a holding bolt situated in said bore and being longitudinally displaceable therein; said holding bolt being surrounded by said guide sleeve; said holding bolt having clamping slopes disposed on the circumference of the holding bolt; said clamping slopes extending at an acute angle to the central axis; said acute angle of said clamping slopes converging in said first direction; said clamping element cooperating with said clamping slopes, whereby the clamping elements are pivoted by camming action of the slopes upon axial displacement of said holding bolt in said first direction.

* * * * *